United States Patent [19]

Takahashi et al.

[11] Patent Number: 5,366,941
[45] Date of Patent: Nov. 22, 1994

[54] COMPOSITE CERAMICS AND THEIR PRODUCTION PROCESS

[75] Inventors: Tomonori Takahashi, Aichi; Manabu Isomura, Nagoya, both of Japan

[73] Assignee: NGK Insulators, Ltd., Nagoya, Japan

[21] Appl. No.: 960,333

[22] Filed: Oct. 13, 1992

[30] Foreign Application Priority Data

Oct. 30, 1991 [JP] Japan ................. 3-284507

[51] Int. Cl.⁵ .................... C04B 35/54; C04B 35/56
[52] U.S. Cl. ............................... 501/92; 423/335; 423/345; 501/97
[58] Field of Search ............... 501/92, 95, 97, 88, 501/89; 423/335, 345, 353, 400

[56] References Cited

U.S. PATENT DOCUMENTS

| | | | |
|---|---|---|---|
| 3,890,250 | 6/1975 | Richerson | 501/89 |
| 4,956,317 | 9/1990 | Yokoi et al. | 501/92 |
| 4,975,394 | 12/1990 | Kanzaki et al. | 501/97 |
| 5,066,423 | 11/1991 | Kubo et al. | 501/97 |
| 5,098,449 | 3/1992 | Hwang et al. | 51/307 |
| 5,132,257 | 7/1992 | Kodama et al. | 501/95 |
| 5,164,346 | 11/1992 | Guinchi et al. | 501/95 |

FOREIGN PATENT DOCUMENTS

| | | |
|---|---|---|
| 54-123110 | 9/1979 | Japan . |
| 56-51153 | 12/1981 | Japan . |
| 3-103360 | 4/1991 | Japan . |

OTHER PUBLICATIONS

Proceedings of the 23rd Automotive Technology Coordination Meeting, "Mechanical Properties of SiC Fiber-Reinforced Reaction-Bonded $Si_3N_4$ Composites" pp. 199–208 (1992) no month.

Proceedings of the 1st International Symposium on the Science of Engineering Ceramics, "SiC-Platelet Reinforcement of $Si_3N_4$ Composites", pp. 371–376 (1992) no month.

Zeng et al, "Hot Isostatic Pressing and High-Temperature Strength of Silicon Nitride-Silica Ceramics", Journal of American Ceramic Society, vol. 73(4), 1095–97 (1990) no month.

Primary Examiner—Karl Group
Assistant Examiner—A. Wright
Attorney, Agent, or Firm—Adduci, Mastriani, Schaumbert & Schill

[57] ABSTRACT

A composite ceramic material that is stable and shows a high strength in the temperature range of room temperature to 1600° C. as well as has a toughness high-enough to be used as structural material and a process for producing it are provided. This composite ceramic material is composed of a matrix substantially made up of $Si_3N_4$ and $Si_2N_2O$ and a dispersion phase substantially made up of SiC where the matrix contains 0.05% by weight or less of metal element impurities such as Al, Ca and Fe. SiC grains or fibers are dispersed in the dense matrix made up of $Si_3N_4$ and $Si_2N_2O$ fine grains, which are substantially free from element impurities except Si, C and O. According to one aspect of this invention, this ceramic material is produced by $Si_3N_4$ with $SiO_2$ to form matrix powders that contain 0.05% by weight or less of metal element impurities such as Al, Ca and Fe, mixing and compacting the powders with a SiC dispersion phase to form a compact and firing or sintering the compact under pressure for densification.

21 Claims, No Drawings

COMPOSITE CERAMICS AND THEIR PRODUCTION PROCESS

BACKGROUND OF THE INVENTION

The present invention relates to composite ceramics having high strength at high temperatures and their production process.

So far, composite or engineering ceramics containing silicon nitride as the matrices and spherical particles, plate-form particles, whiskers or fibers of SiC as dispersion phases have been studied. *Proceedings of the 23rd Automotive Technology Coordination Meeting*, pp. 199–208 refers to engineering ceramics in which the matrices are formed of reaction sintered silicon nitride and the dispersion phases are made up of SiC fibers. *Proceedings of the 1st International Symposium on the Science of Engineering Ceramics*, pp. 371–376 describes engineering ceramics in which the matrices are formed of sintered silicon nitride and the dispersion phases are made up of plate-shaped particles of SiC. JP-A-62-12760 discloses engineering ceramics in which the matrices are formed of a $Y_2O_3$-$Al_2O_3$ type of silicon nitride and the dispersion phases are made up of SiC fibers and which are compacted by hot-pressing. JP-A-01-243133 sets forth engineering ceramics in which the matrices are formed of rare earth oxide and silicon nitride and the dispersion phases are made up of plate-form particles of SiC.

JP-P-56-51153, on the other hand, refers to a heat-resistant sintered compact comprising o' and SiAlON phases. The term "o' phase" refers to a solid solution in which the solute $Al_2O_3$ fits into the solvent $Si_2N_2O$ phase. In addition, *Journal of American Ceramic Society*, Vol. 74, No. 4, pp. 1095–1097 (1990) shows a heat-resistant sintered body made up of an $SiO_2$ glass phase and $Si_3N_4$.

When the matrix of a conventional composite ceramic material is a reaction sintered type of $Si_3N_4$, however, some difficulty is involved in packing it completely, so that it is inferior in terms of strength and acid resistance and so cannot be used at a temperature of higher than 1400° C. When the matrix of a composite ceramic material is $Si_3N_4$ containing a sintering aid such as rare earth oxides or $Al_2O_3$, it cannot again be used at a temperature of higher than 1400° C., because the grain boundary containing these sintering aids is softened, or the eutectic point of the sintering aids and $SiO_2$ contained in the $Si_3N_4$ material is low, so that a liquid phase can be formed, resulting in a drop of its heat resistance.

Even a heat-resistant sintered body made up of the o' and SiAlON phases that are not composite ceramic materials, when containing an Al component, undergoes a drop of its strength at 1400° C. or higher due to the softening of the grain boundary phase, etc. In another heat-resistant sintered body constructed from the $SiO_2$ glass phase and $Si_3N_4$, the $SiO_2$ glass phase is unstable at high temperatures. Further, these sintered parts that are not composite ceramics can hardly be used as structural material, because they have no microstructure comprising a columnar crystal characteristic of the sintered silicon nitride part and a grain boundary phase and so have low toughness.

Thus, an object of this invention is to provide composite or engineering ceramics that are stable and have a high strength in the temperature range of room temperature to as high as 1600° C. and possess a toughness high-enough to be usable as structural materials and a process for producing them.

SUMMARY OF THE INVENTION

According to one aspect of this invention, there is provided a composite ceramic material characterized in that the matrix is substantially made up of $Si_3N_4$ and $Si_2N_2O$, the dispersion phase is substantially made up of SiC and the amounts of impurities that are metal elements such as Al, Ca and Fe in the matrix are 0.05% by weight or less. More specifically, SiC grains or fibers are dispersed in the matrix comprising dense and fine grains of $Si_3N_4$ and $Si_2N_2O$ in the substantial absence of impurities that are elements except Si, C and N.

According to another aspect of this invention, there is provided a process for producing a composite or engineering ceramic material characterized by mixing $Si_3N_4$ and $SiO_2$ to prepare matrix powders containing impurities that are Al, Ca, Fe and so on in an amount of 0.05% by weight or less, mixing the powders with a SiC dispersion phase for compacting or packing or alternatively compacting or packing the powders while the SiC dispersion phase is dispersed therein to form a compact, and sintering the compact under pressure for densification.

DETAILED DESCRIPTION OF THE INVENTION

The composite ceramic material of this invention, because of its matrix comprising substantially $Si_3N_4$ and $Si_2N_2O$ and containing impurities that are such metal elements as Al, Ca and Fe in an amount of 0.05% by weight or less, is stable and shows a high strength and oxidation resistance in the temperature range of room temperature to as high as 1600° C. $Si_3N_4$ is a $\beta$ crystal particle in which the solute $Al_2O_3$ does not substantially fit, while $Si_2N_2O$ is an o' phase crystal particle in which the solute $Al_2O_3$ does not substantially fit.

Preferably, the weight ratio of $Si_3N_4$ to $SiO_2$ lies in the range of 98 to 2–85 to 15, because the matrix can be easily densified and because the former is easily crystallized into a $\beta$ crystal and the latter into an o' phase crystal. More preferably, $Si_3N_4$:$SiO_2$=94:6 to 88:12 (by weight).

SiC that forms the dispersion phase may be in the form of spherical particles, plate-shaped particles or fibers, which serve well to increase toughness through their own intrinsic mechanisms, but the greatest effect is obtained in the form of fibers. Next to this are the plate-shaped particles. For instance, the plate-shaped particles may be those made by AMI Co., Ltd or Grade M made by C-axis Co., Ltd. and the fibers may be Textron SCS-6 and SCS-9. The spherical particles have preferably a particle diameter of 5 to 20 $\mu$m, and the plate-shaped particles have preferably a major diameter of 10 to 40 $\mu$m. The spherical and plate-shaped particles, if small in diameter, produce no effect on improving toughness and, if too large, give rise to cracks that are responsible for a lowering of strength. Preferably, the fibers should have a diameter of 200 $\mu$m or less. The fibers, if too large in diameter, embrittle, failing to produce an effect on improving toughness and giving rise to a lowering of strength.

When the dispersion phase consists of spherical or plate-shaped particles, they should preferably account for 5 to 30% by weight of the composite ceramic material. Below 5% by weight, no effect is achieved on improving toughness, whereas above 30% by weight, some difficulty is involved in the densification of the dispersion phase, or alternatively the dispersion phase agglomerates, presenting a source for initiating cracks that are in turn responsible for a lowering of strength.

When the dispersion phase consists of fibers, they should preferably account for 20 to 70% by weight of the composite ceramic material. In this case, however, note that due to their anisotropy, care should be taken of the geometry of parts.

It is important that the matrix of the composite ceramic material according to this invention contains impurities that are such metal elements as Al, Ca and Fe in an amount of 0.05% by weight or below and that the matrix is substantially made up of elements, say, Si, C, O and N. If the amount of the impurities contained in the matrix exceeds 0.05% by weight, then the strength of the composite ceramic material drops at temperatures of higher than 1400° C.

When the composite ceramic material of this invention is produced by the production process mentioned above, it is preferred that the raw materials, $Si_3N_4$ and $SiO_2$, are reduced to fine particles having a mean particle diameter of 1 μm or less. However, note that the $SiO_2$ material may be contained in the $Si_3N_4$ as any impurity. Alternatively, the $SiO_2$ material may contain a given amount of an $SiO_2$ component obtained by the oxidation of the $Si_3N_4$ material. In order to obtain a composite ceramic material that undergoes no strength reduction at high temperatures as mentioned above, it is essentially required that all the materials contain such impurities as Al, Ca and Fe in an amount of 0.05% by weight or less.

The $Si_3N_4$ and $SiO_2$ materials are mixed dry or wet by means of some suitable equipment, for instance, a ball mill, a vibration mill or an attrition mill. In order to obtain the preferable composition mentioned above, mixing is preferably done such that the ratio of $Si_3N_4$ to $SiO_2$ including $SiO_2$ contained in the $Si_3N_4$ material is expressed in terms of $Si_3N_4:SiO_2=98:2$ to 85:15 (by weight). A more preferable ratio of $Si_3N_4$ to $SiO_2$ lies in the range of 94:6 to 88:12 (by weight).

When the dispersion phase consists of the spherical or plate-shaped particles of SiC, they are mixed with the mixed powders of the $Si_3N_4$ and $SiO_2$ materials. In order to obtain a composite ceramic material having superior properties, the spherical particles of SiC should preferably have a particle diameter of 5 to 20 μm, while the plate-shaped particles should preferably have a major diameter of 10 to 40 μm, as already mentioned. It is also preferred that they account for 5 to 30% by weight of the mixed powders of a composite ceramic material. In order to obtain a composite ceramic material that undergoes no strength reduction at high temperatures as mentioned above, it is essentially required that the amount of the impurities contained in the matrix be 0.05% by weight or below. This also holds for the dispersion phase, and if there is no drop of the strength of the dispersion phase itself and impurities are not diffused therefrom in the matrix, it is unlikely that the high-temperature strength of the resultant composite ceramic materials will drop.

Mixing of the raw powders for the matrix with the spherical or plate-form particles of SiC should be done without detriment to the shapes and sizes of those particles. The obtained mixed powders may be dried and granulated, as required, and then molded into parts as by drying pressing, injection molding or casting.

When the dispersion phase consists of fibers, the raw powders for the matrix are filled dry or wet in the interstices among the pre-formed fibers of SiC. Alternatively, the raw powders for the matrix are formed while the fibers are dispersed in them, and this is repeated until the desired product with the fibers dispersed in them are obtained.

The obtained shape is fired or sintered by hot pressing using a graphite mold, or alternatively capsule HIP using $SiO_2$ type glass or $SiO_2$-$B_2O_3$ type glass like Vycor or Pyrex glass for densification. Preferably, the firing or sintering temperature should lie in the range of 1800° to 2200° C. A preferable sintering atmosphere is $N_2$, but an Ar atmosphere may be used in the case of capsule HIP. In addition, following hot-pressing, capsule-free or capsule HIP may be applied for further densification.

In the process of firing or sintering, the reaction between $Si_3N_4$ and $SiO_2$ occurs in the matrix to form $Si_3N_4$ and $Si_2N_2O$. When α-$Si_3N_4$ is used as the raw material for $Si_3N_4$, it changes to β-$Si_3N_4$. Most of the Si, C, etc., contained in the dispersion phase react with a gas phase, etc., and are scattered about or converted into SiC, $Si_3N_4$, $Si_2N_2O$, etc.

In what follows, reference will be made to the examples of this invention.

$Si_3N_4$ powders that contain 2.5% by weight of $SiO_2$ and 0.05% by weight of impurities that are metal elements and have a mean particle diameter of 0.6 μm and in which α-$Si_3N_4$ accounts for 95% by weight of $Si_3N_4$ were blended and mixed wet with $SiO_2$ powders that contain 0.04% by weight of impurities that are metal elements and have a mean particle diameter of 0.8 μm, using water, in the proportions set out in Table 1.

TABLE 1

|   | Amounts of Impurities in $Si_3N_4$ Materials (% by weight) | Blending Ratios (% by weight) | | Bulk Densities (g/cm³) | Strengths (MPa) | |
|---|---|---|---|---|---|---|
|   |   | $Si_3N_4$ | $SiO_2$ |   | Room Temp. | 1600° C. |
| Ex. 1 | 0.05 | 100 | 0 | 3.07 | 430 | 410 |
| Ex. 2 | 0.05 | 97 | 3 | 3.08 | 530 | 520 |
| Ex. 3 | 0.05 | 94 | 6 | 3.09 | 510 | 530 |
| Ex. 4 | 0.05 | 91 | 9 | 3.09 | 520 | 520 |
| Ex. 5 | 0.05 | 88 | 12 | 3.07 | 440 | 430 |
| Comp. Ex. 6 | 0.12 | 100 | 0 | 3.08 | 440 | <100 |
| Comp. Ex. 7 | 0.12 | 97 | 3 | 3.09 | 550 | <100 |
| Comp. Ex. 8 | 0.12 | 94 | 6 | 3.07 | 520 | <100 |
| Comp. Ex. 9 | 0.12 | 91 | 9 | 3.09 | 510 | <100 |
| Comp. Ex. 10 | 0.12 | 88 | 12 | 3.06 | 460 | <100 |

The obtained slurry was dried and granulated. Then, a compact of 50×40×6 mm in size was prepared and fired or sintered at 1900° C. by capsule HIP using $SiO_2$-$B_2O_3$ type glass for densification, whereby sintered composite ceramics (Examples 1-5) comprising the matrices according to this invention were obtained $Si_3N_4$ powders that contain 2.8% by weight of $SiO_2$ and 0.12% by weight of metal element impurities and have a mean particle diameter of 0.5 μm and in which α-$Si_3N_4$ accounts for 96% by weight of $Si_3N_4$ were blended wet with $SiO_2$ powders that contain 0.04% by weight of metal element impurities and have a mean particle size of 0.8 μm in the proportions set out in Table 1, using water. The obtained slurry was dried and granulated. Then, a compact of 50×40×6 mm was prepared and fired or sintered at 1900° C. by capsule HIP using $Si_2$-$B_2O_3$ glass for densification. In this manner, sintered compacts according to Comparative Example 6-10 were obtained. Major impurities were Al, Ca and Fe.

X-ray analysis of the sintered bodies according to Examples 1-5 and Comparative Examples 1-5 showed that they consisted of $\beta$-$Si_3N_4$ and $Si_2N_2O$ phases, and their proportion was in agreement with that presumed from their chemical composition. Observation of the microstructures showed the substantial absence of any amorphous phases. Table 1 also refers to the strengths and bulk densities of the sintered compacts according to Examples 1-5 and Comparative Examples 6-10, as measured at room temperature and 1600° C., respectively, according to JIS-R1601.

As will be noted from Table 1, when the sintered compacts contained 0.05% by weight of metal element impurities, they showed similar strengths at both room temperature and 1600° C. It is presumed that a limited strength reduction at high temperatures may be due to a smaller content of amorphous regions susceptible to softening. In addition, the relation between the crystal phase and the chemical composition and the microstructures of the sintered compacts indicated that when the amounts of the metal element impurities are below 0.05% by weight, substantial crystallization takes place in the compositional proportion of $Si_3N_4$ and $SiO_2$, if it lies in the range referred to in the examples.

EXAMPLE 11-22

The matrix material used in Example 3 and referred to in Table 1 in a slurried state was added and mixed with the spherical or plate-form particles of SiC, as set out in Table 2. Then, a compact of 50×40×6 mm was prepared and fired or sintered at 1900° C. by capsule HIP using $SiO_2$-$B_2O_3$ type glass for densification. In this manner, composite ceramics according to Examples 11-22 of this invention were prepared.

well in Table 2. The toughness $K_{IC}$ of the sintered composite ceramic material of Example 3 of this invention shown in Table 1 was 3·MPam$^{178}$. Thus, the toughness $K_{IC}$ of the composite ceramics of Examples 1-22 are higher than that of Example 3 and so improved over it in terms of toughness.

EXAMPLE 23-26

The matrix material used for the sintered body according to Example 3 of this invention, shown in Table 1, was dried and granulated. This material was compacted in a mold, SiC fibers were dispersed thereon in a one-dimensional direction, and another matrix material was compacted thereon. In the mold, these operations were repeated to form a compact, which was then fired or sintered at 1900° C. for densification by capsule HIP using $SiO_2$-$B_2O_3$ type glass, whereby composite ceramic materials according to Examples 23-26 were obtained.

TABLE 3

| | SiC Fibers | | | | | |
| | Mean Diameter (μm) | Amount of Dispersion (% by weight) | Bulk Densities (g/cm³) | Strengths (MPa) | | Post-Grooving Strengths (MPa) |
| --- | --- | --- | --- | --- | --- | --- |
| | | | | Room Temp. | 1600° C. | |
| Ex. 23 | 160 | 20 | 3.09 | 630 | 610 | 580 |
| Ex. 24 | 160 | 40 | 3.04 | 680 | 690 | 620 |
| Ex. 25 | 160 | 70 | 3.01 | 650 | 650 | 640 |
| Ex. 26 | 60 | 40 | 3.05 | 690 | 670 | 600 |

The strengths and bulk densities of the composite ceramics of Examples 23-26 were measured at room temperature and 1600° C. according to JIS-R1601, and the results are set out in Table 3, which indicates that they show equivalent strengths at both room temperature and 1600° C.

TABLE 2

| | | SiC Particles | | | | | | |
| | Shape | Mean Particle Diameter (μm) | Mean Major Diameter (μm) | Amount of Addition (% by weight) | Bulk Densities (g/cm³) | Strengths (MPa) | | $K_{IC}$ (MPam$^{\frac{1}{2}}$) |
| --- | --- | --- | --- | --- | --- | --- | --- | --- |
| | | | | | | Room Temp. | 1600° C. | |
| Ex. 11 | Spheres | 6 | — | 5 | 3.08 | 580 | 560 | 4 |
| Ex. 12 | Spheres | 6 | — | 15 | 3.09 | 550 | 550 | 5 |
| Ex. 13 | Spheres | 6 | — | 30 | 3.12 | 560 | 540 | 5 |
| Ex. 14 | Spheres | 20 | — | 5 | 3.09 | 570 | 580 | 5 |
| Ex. 15 | Spheres | 20 | — | 15 | 3.08 | 550 | 540 | 6 |
| Ex. 16 | Spheres | 20 | — | 30 | 3.10 | 540 | 540 | 6 |
| Ex. 17 | Plates | — | 12 | 5 | 3.05 | 590 | 560 | 7 |
| Ex. 18 | Plates | — | 12 | 15 | 3.06 | 570 | 570 | 8 |
| Ex. 19 | Plates | — | 12 | 30 | 3.08 | 550 | 520 | 8 |
| Ex. 20 | Plates | — | 36 | 5 | 3.04 | 560 | 550 | 8 |
| Ex. 21 | Plates | — | 36 | 15 | 3.06 | 540 | 510 | 10 |
| Ex. 22 | Plates | — | 36 | 30 | 3.09 | 520 | 530 | 10 |

The strengths and bulk densities of the composite ceramics of the Examples 11-12 were measured at room temperature and 1600° C. according to JIS-R1601, and the results are set out in Table 2. As will be understood from Table 2, the composite ceramics of Examples 11-22 showed equivalent strengths at both room temperature and 1600° C. Their $K_{IC}$ was also determined according to JIS-R1067, and the results are set out as In addition, a one hundred-μm groove was provided in a surface of a tensile test piece according to JIS-R1601, and load was applied thereon as in the strength test to measure the breaking load. This breaking load calculated as strength was compared with the room-temperature strength of a groove-free test piece, and the results are set out in Table 3. The sintered body according to Example 3 shown in Table 1 was reduced to a strength of 130 MPa—a 75% reduction, but the composite ceramics according to Examples 23–26 have lower strength reduction due to the grooves, showing that their toughness is improved.

As will be understood from what has been explained above, the composite ceramic material according to this invention is produced by mixing $Si_3N_4$ with $SiO_2$ to prepare matrix powders, mixing said powders with an SiC dispersion phase for compacting or compacting said powders while the SiC dispersion phase is dispersed in them, thereby forming a compact and firing or sintering said compact under pressure for densification, and is characterized in that said matrix is substantially made up of $Si_3N_4$ and $Si_2ON_2$, the dispersion phase is substantially made up of SiC and the amounts of metal element impurities such as Al, Ca and Fe are below 0.05% by weight. This composite ceramic material has an effect that not only does it show equivalent high strengths at 1600° C. and room temperature but also it shows a high toughness.

We claim:

1. A composite ceramic material comprising:
    a matrix comprised of $Si_3N_4$ and $Si_2N_2O$, the weight ratio of $Si_3N_4$ to $Si_2N_2O$ in said matrix in terms of $Si_3N_4$ and $SiO_2$ being within the range of 98:2 to 85:15; and
    a dispersion phase comprised of SiC dispersed in said matrix, said material being resistant to loss of strength at elevated temperature such that a strength of said material at elevated temperatures up to 1600° C. is approximately the same as a strength of said material at room temperature.

2. The composite ceramic material of claim 1, wherein said matrix contains 0.05% by weight or less of metal impurities.

3. The composite ceramic material of claim 2, wherein said metal impurities are selected from the group consisting of Al, Ca, Fe, and combinations thereof.

4. The composite ceramic material of claim 1, wherein said dispersion phase comprised of SiC is in the form of fibers having a diameter of 200 μm or less.

5. The composite ceramic material of claim 1, wherein said dispersion phase comprised of SiC is in the form of plate-shaped particles having a major particle diameter of 10 μm to 40 μm.

6. The composite material of claim 1, wherein said dispersion phase comprised of SiC is in the form of spherical particles having a mean particle diameter of 5 μm to 20 μm.

7. The composite ceramic material of claim 4, wherein said dispersion phase is 20% to 70% by weight of said material.

8. The composite ceramic material of claim 5, wherein said dispersion phase is 5% to 30% by weight of said material.

9. The composite ceramic material of claim 6, wherein said dispersion phase is 5% to 30% by weight of said material.

10. The composite ceramic material of claim 1, wherein the weight ratio of $Si_3N_4$ to $Si_2N_2O$ in said matrix in terms of $Si_3N_4$ and $SiO_2$ is within the range of 94:6 to 88:12.

11. The composite ceramic material of claim 1, wherein said matrix consists essentially of $Si_3N_4$ and $Si_2N_2O$.

12. The composite ceramic material of claim 7, wherein said matrix consists essentially of $Si_3N_4$ and $Si_2N_2O$.

13. The composite ceramic material of claim 8, wherein said matrix consists essentially of $Si_3N_4$ and $Si_2N_2O$.

14. The composite ceramic material of claim 9, wherein said matrix consists essentially of $Si_3N_4$ and $Si_2N_2O$.

15. A composite ceramic material comprising:
    a matrix consisting essentially of $Si_3N_4$ and $Si_2N_2O$, the weight ratio of $Si_3N_4$ to $Si_2N_2O$ in said matrix in terms of $Si_3N_4$ and $SiO_2$ being within the range of 94:6 to 88:12, said matrix containing 0.05% by weight or less of metal impurities selected from the group consisting of Al, Ca, Fe, and combinations thereof; and
    a dispersion phase comprised of SiC dispersed in said matrix wherein said composite ceramic has a strength at elevated temperatures up to 1600° C. that is approximately the same as the strength of said composite ceramic at room temperature.

16. The composite ceramic material of claim 15, wherein said dispersion phase comprised of SiC is 20% to 70% by weight of said material and is in the form of fibers having a diameter of 200 μm or less.

17. The composite ceramic material of claim 15, wherein said dispersion phase comprised of SiC is 5% to 30% by weight of said material and is in the form of plate-shaped particles having a major particle diameter of 10 μm to 40 μm.

18. The composite ceramic material of claim 15, wherein said dispersion phase comprised of SiC is 5% to 30% by weight of said material and is in the form of spherical particles having a mean particle diameter of 5 μm to 20 μm.

19. A process for producing a composite ceramic material, said process comprising the steps of:
    mixing $Si_3N_4$ powder with $SiO_2$ powder to form a matrix powder, the weight ratio of $Si_3N_4$ to $SiO_2$ in said matrix powder being within the range of 98:2 to 85:15, said matrix powder containing 0.05% by weight or less of metal impurities;
    forming a compact comprised of said matrix powder and a dispersion phase comprised of SiC dispersed in said matrix powder; and
    sintering said compact under pressure to densify said compact such that the strength of said composite ceramic at elevated temperatures up to 1600° C. is approximately the same as the strength of said ceramic at room temperature.

20. The process of claim 19, wherein said compact is formed by mixing said matrix powder with one of the group consisting of spherical and plate-shaped particles of SiC, and compacting the thus-formed mixture.

21. The process of claim 19, wherein said compact is formed by compacting a first amount of said matrix powder in a mold, dispersing SiC fibers on said compacted matrix powder, and compacting a second amount of said matrix powder thereon.

* * * * *